United States Patent [19]

Bederke et al.

[11] Patent Number: 5,614,590
[45] Date of Patent: Mar. 25, 1997

[54] COATING AGENTS, PROCESS FOR THEIR PREPARATION AND THEIR USE FOR THE PREPARATION OF TRANSPARENT TOP LAYERS ON MULTILAYER COATINGS

[75] Inventors: Klaus Bederke, Sprockhövel; Friedrich Herrmann, Wuppertal; Hermann Kerber, Wuppertal; Hans-Martin Schönrock, Wuppertal, all of Germany

[73] Assignee: Herberts Gesellschaft mit beschrankterhaftung, Wuppertal, Germany

[21] Appl. No.: 119,289

[22] Filed: Sep. 9, 1993

[30] Foreign Application Priority Data

Sep. 17, 1992 [DE] Germany .......................... 42 31 071.7
Oct. 30, 1992 [DE] Germany .......................... 42 36 673.9

[51] Int. Cl.⁶ ....................................... C08F 8/30

[52] U.S. Cl. .......................... 525/127; 525/123; 525/222; 525/223; 525/228; 525/418; 525/450; 525/451; 525/452; 525/453; 525/454; 427/384; 427/388.2

[58] Field of Search ................................... 525/123, 127, 525/222, 223, 228, 418, 450, 451, 452, 453, 454; 427/384, 388.2

[56] References Cited

U.S. PATENT DOCUMENTS 4,565,730  1/1986  Poth et al. .......................... 428/204

*Primary Examiner*—Stevan A. Resan
*Assistant Examiner*—Mary Critharis
*Attorney, Agent, or Firm*—Schweitzer Cornman & Gross

[57] ABSTRACT

A transparent coating agent which is free of heavy metal catalysts and which contains a hydroxy functional (meth-)acrylic copolymer based binder, an aliphatic or cycloaliphatic polyisocyanate crosslinking agent, a solvent, and lacquer adjuvant.

4 Claims, No Drawings

COATING AGENTS, PROCESS FOR THEIR PREPARATION AND THEIR USE FOR THE PREPARATION OF TRANSPARENT TOP LAYERS ON MULTILAYER COATINGS

BACKGROUND OF THE INVENTION

The invention relates to a coating agent which can be used for the preparation of transparent top layers on multilayer coatings.

Coating agents for the preparation of transparent top layers on multilayer coatings are known. DE-A-33 22 037 describes such coating agents which are based on (meth)acrylic copolimerisates. Such coating agents contain a mixture of specific (meth)acrylic copolymerisates allowing a solids content up to 55 wt.-% during processing.

However, it is desired to enhance the solids contents of coating agents, especially of such coating agents which are used for spray application in order to reduce the content of volatile and possibly toxic solvents by reasons of environmental protection and safety at work. By the same reasons it is desirable to omit the use of heavy metal catalysts, which are normally used in such systems.

SUMMARY OF THE INVENTION

Therefore, it is the object of the present invention to provide a coating agent which is particularly suitable for the preparation of transparent top layers in multilayer coatings, which can be applied with enhanced solids content and which provides a good flow and excellent sagging qualities of topcoats.

It has now been found that this object can be achieved by a coating agent which is the subject of the present invention and which contains binders on the basis of one or more (meth)acrylic copolymerisates comprising a mixture of A) 40–60 wt.-% of one or (meth)acrylic copolymerisates, containing hydroxy groups, obtainable by copolymerization of a1) 50–70 wt.-% of one or more acrylic esters, which can be admixed with one or more acrylic acid hydroxy alkyl esters in an amount furnishing a hydroxy number of the mixture of 40–70 mg KOH/g, with a2) 30–50 wt.-% of one or more methacrylic esters which can be admixed with one ore more methacrylic acid hydroxy alkyl esters in an amount furnishing a hydroxy number of the mixture of 180–450 mg KOH/g and B) 60–40 wt.-% of one or more (meth)acrylic copolymerisates, containing hydroxy groups, obtainable by copolymerization of b1) 27–40 wt.-% of one or more acrylic acid alkyl esters, b2) 49–55 wt.-% of one or more methacrylic acid esters which can be admixed with one or more methacrylic acid hydroxy alkyl esters in amounts furnishing a hydroxy number of the mixture of 240–300 mg KOH/g, b3) 1–3 wt.-% of acrylic acid, b4) 10–15 wt.-% of one or more vinyl esters of aliphatic saturated monocarboxylic acids, wherein the carboxyl group is bound to a tertiary carbon atom, components A) and B) as well as components a1) and a2), as well as components b1) to b4) in each case adding up to 100 wt.-%.

DETAILED DESCRIPTION OF THE INVENTION

The coating agents of the invention contain one or more aliphatic and/or cycloaliphatic polyisocyanates or a mixture thereof as crosslinking agents together with both of the above mentioned (meth)acrylic copolimerisates. Further, the coating agents contain one or more solvents, as well as conventional lacquer adjuvants, e.g. light stabilisers.

The preparation of the (meth)acrylic copolymerisates contained in the coating agents of the invention can be achieved by polymerisation according to conventional processes, e.g. mass polymerisation, solution polymerisation or bead polymerisation. The different polymerisation processes are well known and, e.g. described in: Houben-Weyl, Methoden der Organischen Chemie, 4th Edition, Vol. 14/1, pages 24–255 (1961).

The solution polymerisation is preferred for the preparation of the (meth)acrylic copolymerisates used in the coating agents of the invention. In order to carry out this process the solvent is filled into the reaction vessel and heated to boiling point and the mixture of monomers and initiators is continuously dosed in for a certain time.

The polymerisation is carried out at temperatures of from 60° C. to 160° C., preferably of from 120° C. to 150° C.

The polymerisation reaction is started with conventional polymerisation initiators. Examples for initiators are per-compounds and azo-compounds which split up thermically into radicals during a reaction of first order. The kind and the amount of initiators are chosen in such a way that during addition at the polymerisation temperature the amount of radicals is as constant as possible.

Examples of preferred initiators for the polymerisation are: dialkylperoxides, such as di-tert-butylperoxide, di-cumylperoxide; di-acylperoxides, such as di-benzoylperoxide, di-lauroylperoxide; hydroperoxides, such as cumolhydroperoxide, tert-butylhydroperoxide; peresters, such as tert-butyl-perbenzoate, tert-butyl-perpivalate, tert-butyl-per-3.5.5-trimethyl hexanoate, tert-butyl-per-2-ethylhexanoate; peroxy dicarbonates, such as di-2-ethylhexyl peroxy dicarbonate, dicyclohexyl peroxy dicarbonate; perketales, such as 1.1-bis-(tert-butylperoxy)-3.5.5-trimethyl cyclohexane, 1.1-bis-(tert-butylperoxy)cyclohexane; ketone peroxides, such as cyclohexanone peroxide, methylisobutyl ketone peroxide; azo compounds, such as 2.2'-azo-bis(2.4-dimethyl valeronitrile), 2.2'-azo-bis(2-methyl butyronitrile), 1.1'-azo-bis-cyclohexane carbonitrile, azo-bis-isobutyronitrile.

The peroxide initiators, particularly the peresters are preferably used in an amount of 3 to 8 wt.-% of the monomer weight.

Organic solvents which can suitably be used for the polymerisation in solution as well as in the finally obtained coating agents of the invention are, e.g., glycol ethers, such as ethylene glycol dimethyl ether; glycol ether esters, such as ethyl glycol acetate, butyl glycol acetate, 3-methoxy-n-butyl acetate, butyl diglycol acetate, methoxy propyl acetate; esters, such as butyl acetate, isobutyl acetate, amyl acetate; ketones, such as methyl ethyl ketone, methyl isobutyl ketone, diisobutyl ketone, cyclohexanone, isophorone; aromatic hydrocarbons, such as xylene, Solvesso 100 (registered Trademark) and aliphatic hydrocarbons can also be used admixed with the above mentioned solvents.

In order to adjust the molecular weight at the preferred polymerisation in solution it is possible to use chain-transferring agents. Examples are mercaptanes, thioglycolic acid esters, chlorine containing hydrocarbons, cumol, dimeric α-methylstyrene.

The conditions of the polymerisation (reaction temperature, addition time of the monomer mixture, concentration of the solution) are adjusted in such a way that the (meth)acrylic copolymerisates for the coating agent prepared in accordance with the invention have a weightaverage molecular weight (measured by gelpermeation chromatography, using polystyrene as a standard substance) of 3000 to 5000 for component A) and 5000 to 8000 for component B).

The hydroxy group containing (meth)acrylic copolymerisates of the coating agent prepared in accordance with the invention have a glass transition temperature of 10° C. to +30° C. for component A) and +20° C. to 50° C. for component B), calculated as the glass transition temperature of the homopolymerisates achieved with the single monomers, as described in the literature (FOX-equation as described, e.g. in Polymere Werkstoffe, Bather, 1985, page 307).

The hydroxy number of the total component A) is preferably 120 to 170 mg KOH/g. The hydroxy number of the total component B) is preferably 120 to 160 mg KOH/g.

Alkylesters of acrylic acid or methacrylic acid can be used as monomer components for the preparation of the hydroxy group containing (meth)acrylic copolymerisates (components A) and B)), for example: methylacrylate, methyl methacrylate, ethyl acrylate, ethyl methacrylate, isopropsyl methacrylate, tert-butyl acrylate, n-butyl acrylate, n-butyl methacrylate, isobutyl acrylate, isobutyl methacrylate, cyclohexyl methacrylate, trimethylcyclohexyl methacrylate, 2-ethylhexyl acrylate, 2-ethylhexyl methacrylate, lauryl acrylate, lauryl methacrylate, staeryl acrylate, stearyl methacrylate, isobornyl acrylate, isobornyl methacrylate; hydroxyalkyl esters of acrylic acid or methacrylic acid, such as β-hydroxyethyl acrylate, β-hydroxyethyl methacrylate, β-hydroxypropyl acrylate, β-hydroxy propyl methacrylate, butanediol-1.4-monoacrylate, butanediol-1.4-monomethacrylate, hexanediol-1.6-monoacrylate, hexanediol-1.6-monomethacrylate.

In order to provide the (meth)acrylic copolymerisate with carboxyl groups, acrylic acid is inserted by polymerisation in such an amount that the acid number of component B) is 25 to 50 mg KOH/g.

The coating agents of the invention are combined with crosslinking agents, such as polyisocyanates or polyisocyanate prepolymers in order to prepare transparent top layers of multilayer coatings.

The amount of polyisocyanate crosslinking agent is preferably chosen in such a way that 0.5 to 2.0 isocyanate groups are achieved per one hydroxy group of the binder components. Excess isocyanate groups can react with humidity and assist the crosslinking reaction. It is possible to use aliphatic and/or cycloaliphatic polyisocyanates, such as hexamethylene diisocyanate, trimethylhexamethylene diisocyanate, isophorone diisocyanate; and polyisocyanates, containing biuret groups, allophanate groups, urethane groups or isocyanurate groups. It is possible that the polyisocyanates can at least be blocked partially with CH-acide, NH-acide and/or OH-acide compounds.

Examples for such polyisocyanates are the reaction products of 3 moles hexamethylene diisocyanate with 1 mole water, having an NCO-content of about 22% (corresponding to the commercial product Desmodur N$^R$, BAYER AG) and a polyisocyanate, containing isocyanurate groups, obtained by trimerisation of 3 moles hexamethylene diisocyanate, having an NCO-content of about 21.5% (corresponding to the commercial product Desmodur N 3390$^R$, BAYER AG).

The polyisocyanate crosslinking agent can be partially blocked or, if a long-term storable product, i.e. a one-component coating agent is desired, they can be totally blocked with monofunctional compounds containing active hydrogen. The choice of the blocking agent which can be thermally cleaved furnishing free isocyanate groups, depends on the curing conditions of the coating agent of the invention. Examples of suitable blocking agents are lactames such as epsilon-caprolactame, oximes such as methylethyl ketoxime and alcohols such as 2-ethylhexanol. However, the polyisocyanate crosslinking agents are preferably used in an unblocked condition.

It is possible to partially replace the blocked or unblocked polyisocyanate crosslinking agents by conventional aminoplast crosslinking agents in the coating agents of the invention. In order to achieve one-component coating agents, it is also possible to formulate the (meth)acrylic copolymerisates A) and B) in the coating agents of the invention only in combination with conventional aminoplast crosslinking agents, i.e. without combination with blocked or unblocked polyisocyanate crosslinking agents. Examples for an aminoplast crosslinking agent, such as melamine and benzoguanamine resins, are described in Karsten, Lackrohstoffe, Curt R. Vincentz Verlag, 9th edition, 1992. However, it is preferred that the coating agents of the invention do not contain any aminoplast crosslinking agents.

The coating agents containing the binders of the invention can contain the above mentioned solvents and additionally conventional lacquer additives, such as flow agents, e.g. (meth)acrylic homopolymerisates, silicone oils and castor oil, which can be hydrogenated, plasticizers, such as phosphoric acid esters, phthalic acid esters or citric acid esters, antisagging agents, optionally transparent pigments, such as aerosil, theology adjusting agents, such as, e.g. microgels, NAD's (nonaqueous dispersions) and substituted polyurea, light stabilisers, such as benztriazole derivatives and/or HALS-derivatives (hindered amine light stabilisers).

The coating agents of the invention can contain conventional curing accelerators; however, it is a special advantage that it is even possible to cure them without (heavy metal) catalysts at temperatures of 110° to 160° C., preferably below 150° C., providing high brillant coatings.

It is possible to add non-transparent pigments to the coating agents in order to achieve non-transparent coatings.

It is possible to prepare the coating agents of the invention from the single components using conventional processes which are known to the skilled person. It is preferred to add the polyisocyanate component immediately before the application.

The coating agents of the invention can be applied in accordance with known processes, such as, e.g. spraying, dipping, rolling or using the coating knife. The topcoat is applied to a substrate which can already be provided with further coating layers. The applied coating agent is preferably crosslinked by heating after an aeration phase. The curing temperatures are 110° to 160° C., preferably 120° to 150° C. However, it is also possible to cure at lower temperatures, e.g. from 20° to 110° C., preferably from 25° to 80° C. The thickness of the layer of the cured film is about 15–50 μm. A cured, hard, brillant lacquer coat is obtained. In accordance with a preferred embodiment, the coating agent of the invention is applied in the form of a clear lacquer onto a base lacquer, preferably an aqueous base lacquer. It is possible to work wet-in-wet; however, it is also possible to dry the base lacquer previously by heating. An excellent adhesion of both layers is achieved.

It is possible to apply the clear coat compositions of the invention to e.g. base lacquers containing conventional pigments for finish lacquers, preferably effect pigments, such as, e.g. metallic pigments. The binders of the base lacquer are preferably based on polyester resins, polyurethane resins or acrylate resins. Such binders can optionally be crosslinked with crosslinking agents, e.g. melamine derivatives or isocyanate derivatives.

The coating agents of the invention are particularly useful for topcoats, finishing lacquers or clear lacquers which can be used on different fields, and preferably on the field of automotove vehicles. The coating agents of the invention can be used for multilayer coatings, particularly for serial coatings in the automotive sector; however, it is also possible to use them for other purposes, such as for lacquering of household appliances or in the furniture industry.

It is possible to apply the coating agents of the invention having solid contents of more than 55 wt.-%; nevertheless they provide an excellent flow and enable the preparation of high brillant multilayer coatings having excellent topcoats.

The coating agents of the invention are particularly useful for the preparation of transparent top layers of air dried or furnace dried multilayer coatings. They are particularly useful for the industrial coating of automotive bodywork and parts thereof. It is an advantage that they can be applied with a high solids content.

It is possible to apply the coating agents of the invention wet-in-wet to conventional, i.e. solvent containing or aqueous lacquer layers and to cure both layers together at enhanced temperatures. Thus, it is, e.g., possible to prepare transparent top layers by applying the polyisocyanate containing clear lacquers of the invention wet-in-wet to conventional or aqueous base lacquers. It is then possible to cure both layers together. The curing temperatures are, e.g. in the order of 120° to 150° C. The curing times are, e.g. in the order of 20 to 40 minutes.

Therefore, the invention also relates to the preparation of multilayer coatings, or to the use of the coating agents of the invention for the preparation of topcoat layers, e.g. clear coat layers, for curable multilayer coatings.

The following examples explain the invention. Parts and percentages relate to the weight.

Examples 1 to 3

Preparation of the (meth)acrylic copolymerisates of components A) and B).
Preparation of Component A)
Position I (definition and amounts are shown in the following Table 1) is filled into a two liter threenecked ground glass reaction vessel, provided with a stirrer, contact thermometer, ball condenser and dropping funnel, and stirred and heated under reflux up to about 145° C. Position II (monomer mixture+initiator) is continuously dosed in through the dropping funnel for 6 hours. After complete addition the dropping funnel is rinsed with Position III and its content is added to the reaction mixture. Afterwards the mixture is polymerized at about 143° C. for 3 hours in order to provide a reaction of >99%. Then it is cooled to 100° C. and diluted with Position IV to a solids content of about 65%.
Preparation of Component B)
Position I (composition and amounts as demonstrated in Table 1) is added into a two liter threenecked ground glass reaction vessel provided with a stirrer, contact thermometer, ball condenser and dropping funnel and heated under agitation and reflux up to about 139° C. Position II (monomer mixture+initiator) is continuously dosed in through the dropping funnel for 5 hours. After complete addition the dropping funnel is rinsed with Position III and its content is added to the mixture. Then the mixture is polymerized at about 135° C. for 5 further hours, in order to achieve a reaction of >99%. Then it is cooled to 100° C. and diluted with Position IV to a solids content of about 50%.

TABLE 1

(The amounts relate to the weight in gramms)

| Pos.: | Component: | Resin examples Content | | |
|---|---|---|---|---|
| | | 1 A | 2 A | 3 B |
| I | VEOVA 10 | — | — | 60.0 |
| | Solvesso 100 | 200.0 | 200.0 | 90.0 |
| | butylacetate | 100.0 | 100.0 | 56.0 |
| | butanol | — | — | 24.0 |
| | methoxypropyl acetate | — | — | 60.0 |
| II | tert.-butyl acrylate | 280.0 | 280.0 | 151.0 |
| | butyl methacrylate | 80.0 | 140.0 | 40.0 |
| | isobutyl methacrylate | — | — | 40.0 |
| | hydroxypropyl methacrylate | 200.0 | 150.0 | 178.0 |
| | hydroxybutyl acrylate | 50.0 | 50.0 | — |
| | acrylic acid | — | — | 13.0 |
| | tert.-butyl peroxybenzoate | 20.0 | 30.0 | 18.0 |
| | tert.-butyl peroxyoctoate | 20.0 | — | — |
| III | Solvesso 100 | — | — | 40.0 |
| | butylacetate | 30.0 | 30.0 | — |
| IV | Solvesso 100 | — | — | 190.0 |
| | butylacetate | 20.0 | 20.0 | — |
| | xylene | — | — | 40.0 |
| | E | 1000.0 | 1000.0 | 1000.0 |
| | Achieved parameters: | | | |
| | solids content (%) | 65.7 | 65.9 | 50.4 |
| | viscosity (mPas at 25° C.) | 535 | 560 | 130 |
| | hydroxy number (relating to solid resin) | 150 | 120 | 138 |
| | acid number (relating to solid resin) | 4.1 | 4.8 | 28.9 |
| | glass transition temperature (°C.) | 11 | 24 | 31 |

VEOVA 10 = Versatic acid vinylester
Solvesso 100 = solvent (mixture of aromatic hydrocarbons having a boiling range of 162 to 180° C.)

Preparation of multilayer coatings

Example 4

409 parts of the resin solution of Example 3 and 323 parts of the resin solution of Example 1 are homogenously mixed and then 21 parts of a commercial phthalate, 24 parts of a mixture of commercial light stabilizer (HALS derivative and benzotriazole derivate in a ratio of 1:1), 23 parts of a 1% solution of commercial silicone oils in xylene (flow and wetting agent) and 180 parts of a solvent mixture of butyl diglycol acetate, ethoxypropyl acetate, butylglycol acetate and high boiling aromatic hydrocarbons in a ratio of 13:10:12:65 are added under stirring.

30 parts of a 82% solution of an aliphatic isocyanurate polyisocyanate in xylene/butyl acetate (1:1) are homogenously stirred into 100 parts of the above obtained solution. The clear lacquer is used for the following preparation of a multilayer coat:

Carbody sheets, precoated with a commercial cathodically depositable electrophoretic dip layer (KTL) which is used for serial lacquering in the automotive industry (18 μm) and with a commercial surface primer (35 μm) were coated with a commercial water dilutable metallic basecoat, in order to provide a dry film thickness of 15 μm, and predried at 80° C. for 6 minutes. Immediately afterwards, the above obtained clear lacquer was applied wet-in-wet by spraying and cured at 140° C. (temperature of the object) for 20 minutes after aeration for 5 minutes, to achieve a dry film thickness of 35 μm.

Example 5

Example 4 was repeated, however, the 409 parts of the resin solution of Example 3 and the 323 parts of the resin solution of Example 1 were replaced by 414 parts of the resin solution of Example 3 and 318 parts of the resin solution of Example 2.

Example 6

Example 4 was repeated, however, the 409 parts of the resin solution of Example 3 and the 323 parts of the resin solution of Example 1 were replaced by 156 parts of the resin solution of Example 1 and 581 parts of the resin solution of Example 3.

Example 7

Example 4 was repeated, however, the 180 parts of the solvent mixture were replaced by only 100 parts thereof.

In spite of the high solids content, the achieved flow was excellent and high brillant multilayer coatings having excellent topcoats were obtained with the clear lacquers described in Examples 4 to 6.

We claim:

1. A transparent coating agent which is free of heavy metal catalysts, and comprises a solids content of over 55% wt., a hydroxy functional (meth)acrylic copolymer based binder, one or more aliphatic and/or cycloaliphatic polyisocyanate cross linking agents, and one or more of a solvent, and a lacquer adjuvant, wherein said binder is a mixture of (A) from about 40% to about 60% wt. of one or more (meth)acrylic, hydroxyl group containing first copolymer having a hydroxyl number of from about 120 to about 170 mg KOH/g, a weight average molecular weight (Mw) of from about 3,000 to about 5,000, and a glass transition temperature (Tg) of from about 10° C. to about 30° C., said first copolymer being prepared by copolymerizing (a1) from about 50% to about 70% wt., of one or more acrylic esters having optionally admixed thereto one or more acid hydroxy alkyl esters for the mixture to have a hydroxyl number of from about 40 to about 70 mg KOH/g, with (a2) from about 30% to about 50% wt., of one or more methacrylic esters having optionally admixed thereto one or more methacrylic acid hydroxy alkyl esters for the mixture to have a hydroxyl number of from about 180 to about 450 mg KOH/g; and (B) from about 60% to about 40% wt. of one or more hydroxyl group containing (meth)acrylic second copolymer having an acid number of from about 25 to about 50 mg KOH/g, a hydroxyl number of from about 120 to about 160 mg KOH/g, a weight average molecular weight (Mw) of from about 5,000 to about 8,000, and a glass transition temperature (Tg) of from 20° C. to about 50° C., said second copolymer being prepared by copolymerizing (b1) from about 27% to about 40% wt. of one or more acid alkyl esters, with (b2) from about 49% to about 55% wt. of one or more methacrylic acid esters for the mixture to have a hydroxyl number of from about 240 to about 300 mg KOH/g, with (b3) from about 1% to about 3% wt., acrylic acid, and with (b4) from about 10% to about 15% wt., of one or more vinyl esters of aliphatic saturated monocarboxylic acids in which the carboxyl group is bound to a tertiary carbon atom, wherein (A) and (B) total 100%.

2. The coating agent of claim 1, wherein the agent is a top coating agent for application over at least one other coating, and wherein the concentration of said cross linking agent is selected to supply from about 0.5 to about 2.0 isocyanate groups per hydroxyl group of each of the components (A) and (B).

3. A process for preparing the coating agent of claim 1, which comprises preparing the component (A) of (1) from about 50% to about 70% wt., of one or more acrylic esters having optionally admixed thereto one or more acid hydroxy alkyl esters for the mixture to have a hydroxyl number of from about 40 to about 70 mg KOH/g, with (2) from about 30% to about 50% wt., of one or more methacrylic esters having optionally admixed thereto one or more methacrylic acid hydroxy alkyl esters for the mixture to have a hydroxyl number of from about 180 to about 450 mg KOH/g, and preparing the component (B) of (1) from about 27% to about 40% wt. of one or more acid alkyl esters, with (2) from about 49% to about 55% wt. of one or more methacrylic acid esters for the mixture to have a hydroxyl number of from about 240 to about 300 mg KOH/g, with (3) from about 1% to about 3% wt., acrylic acid, and with (4) from about 10% to about 15% wt., of one or more vinyl esters of aliphatic saturated monocarboxylic acids in which the carboxyl group is bound to a tertiary carbon atom, then mixing from about 40% to about 60% wt. of the component (A) with from about 60% to about 40% wt. of the component (B) with one or more of a solvent, an optional lacquer adjuvant, and immediately before use with one or more of said cross linking agents.

4. A process for preparing a multilayer coating on a substrate, which comprises applying a base coat to the substrate or to a primer layer on the substrate, optionally applying additional layers over the base coat, and applying the top coat of claim 1 as the top layer.

* * * * *